US010060415B2

(12) United States Patent
Bogaert et al.

(10) Patent No.: US 10,060,415 B2
(45) Date of Patent: Aug. 28, 2018

(54) EMERGENCY LUBRICATION FOR WIND TURBINE GEARBOXES

(71) Applicants: ZF Friedrichshafen AG, Friedrichshafen (DE); ZF WIND POWER ANTWERPEN N.V., Lommel (BE)

(72) Inventors: Roger Bogaert, Dendermonde (BE); Michiel Van Den Donker, GM Best (NL)

(73) Assignees: ZF Friedrichshafen AG, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 147 days.

(21) Appl. No.: 15/035,814

(22) PCT Filed: Oct. 24, 2014

(86) PCT No.: PCT/EP2014/072805
§ 371 (c)(1),
(2) Date: May 11, 2016

(87) PCT Pub. No.: WO2015/074825
PCT Pub. Date: May 28, 2015

(65) Prior Publication Data

US 2016/0298609 A1 Oct. 13, 2016

(30) Foreign Application Priority Data

Nov. 25, 2013 (DE) ........................ 10 2013 224 017

(51) Int. Cl.
*F03D 80/70* (2016.01)
*F16N 13/02* (2006.01)
(Continued)

(52) U.S. Cl.
CPC ........... *F03D 80/70* (2016.05); *F16H 57/045* (2013.01); *F16H 57/0436* (2013.01);
(Continued)

(58) Field of Classification Search
CPC ......... F16H 2061/0034; F16H 57/0436; F16H 57/0442; F16H 57/045; F03D 15/00;
(Continued)

(56) References Cited

U.S. PATENT DOCUMENTS 1,663,647 A * 3/1928 Brush ..................... F15B 1/027
137/565.19
3,907,001 A * 9/1975 Vanderlaan ............. F04B 9/125
137/116.5

(Continued)

FOREIGN PATENT DOCUMENTS

DE 37 02 008 A1 8/1988
DE 691 08 960 T2 11/1995

(Continued)

OTHER PUBLICATIONS

German Search Report Corresponding to 10 2013 224 017.1 dated Jun. 30, 2014.

(Continued)

*Primary Examiner* — William E Dondero
*Assistant Examiner* — Mark Kenneth Buse
(74) *Attorney, Agent, or Firm* — Davis & Bujold PLLC; Michael J. Bujold

(57) ABSTRACT

A system for emergency lubrication, with a lubricant pump (113) and with at least one outlet opening (125) for delivering lubricant to at least a first lubrication point (107) of a transmission (101), in particular a transmission of a wind turbine. The system includes a first cavity (203), and the lubricant pump (113) is designed to convey at least some of the lubricant into the first cavity (203). The first cavity (203)
(Continued)

207 109 117 123 211
205 209 201 203 111 115 119 is designed to store the lubricant intermediately and to act upon the intermediately stored lubricant with positional energy. In addition, there is a lubricant-conveying connection between the first cavity (203) and the outlet opening (125).

8 Claims, 2 Drawing Sheets

(51) Int. Cl.
*F16N 7/40* (2006.01)
*F16H 57/04* (2010.01)
*F16H 61/00* (2006.01)

(52) U.S. Cl.
CPC ........... *F16H 57/0442* (2013.01); *F16N 7/40* (2013.01); *F16N 13/02* (2013.01); *F05B 2260/403* (2013.01); *F05B 2260/98* (2013.01); *F16H 2061/0034* (2013.01); *F16N 2260/20* (2013.01); *F16N 2260/50* (2013.01); *Y02E 10/722* (2013.01)

(58) Field of Classification Search
CPC ................ F03D 80/70; F05B 2260/403; F05B 2260/98; F16N 13/02; F16N 2260/20; F16N 2260/50; F16N 7/40
USPC ........................................ 184/41, 75, 4, 6.11
See application file for complete search history.

(56) References Cited

U.S. PATENT DOCUMENTS 5,121,815 A 6/1992 François et al.
6,267,147 B1 * 7/2001 Rago ....................... F01D 25/20 138/26
8,230,974 B2 * 7/2012 Parnin ..................... F01D 25/18 184/6.11
8,387,665 B2 * 3/2013 Lundberg .................. F15B 1/24 138/30
8,434,524 B2 * 5/2013 Barth ........................ F15B 1/04 138/26
9,297,454 B2 3/2016 Barthel et al.
2011/0150655 A1 6/2011 Tietze et al.
2013/0133454 A1 * 5/2013 Barthel ............... F16H 57/0447 74/468

FOREIGN PATENT DOCUMENTS

DE 20 2008 001 828 U1 6/2008
EP 2 351 950 A1 8/2011
EP 2 600 037 A1 6/2013
GB 2 201 200 A 8/1988
JP H08-312889 A 11/1996
WO 2008/151583 A2 12/2008

OTHER PUBLICATIONS

International Search Report Corresponding to PCT/EP2014/072805 dated Jan. 16, 2015.
Written Opinion Corresponding to PCT/EP2014/072805 dated Jan. 16, 2015.

* cited by examiner

EMERGENCY LUBRICATION FOR WIND TURBINE GEARBOXES

This application is a National Stage completion of PCT/EP2014/072805 filed Oct. 24, 2014, which claims priority from German patent application serial no. 10 2013 224 017.1 filed Nov. 25, 2013.

FIELD OF THE INVENTION

The invention concerns a system for the emergency lubrication of components of a transmission, in particular for the temporary operation of circulating lubrication for a transmission of a wind turbine in the event that a lubricant pump has failed.

BACKGROUND OF THE INVENTION

From the prior art, for example from the document WO 2008/151583 A2, systems for emergency lubrication are known, in which an electric pump is combined with a mechanical pump. During normal operation the electric pump serves to supply the lubricant. If the electric pump fails, perhaps due to a loss of power(the lubricant supply is maintained by the mechanical pump, which, during this, is driven by rotating components of the transmission. To prevent the mechanical pump from operating in parallel even during normal operation, however, a complex mechanism is required which switches on the mechanical pump for emergency operation, i.e. if the electric pump fails. Furthermore, the mechanical pump loses power if the transmission is stopped and the pump's rotation slows down. Thus, if a wind turbine is slowed down it is not reliably possible to avoid a shortage of lubricant.

The documents EP 2 351 950 B1 and DE 37 02 008 A1 disclose systems for emergency lubrication without a mechanical pump. Instead of the mechanical pump, these systems comprise a container in which lubricant is stored intermediately. The container is positioned at a high level, so the lubricant can flow down from the intermediate container into the transmission without further energy consumption. During normal operation the supply of lubricant to the transmission is designed as a dry sump lubrication system. On transition to emergency operation a valve opens so that the lubricant stored intermediately in the container can flow down into the transmission. Consequently the lubricant level in the transmission rises, so the dry sump lubrication changes to immersion lubrication.

However, there are transmissions in which immersion lubrication is insufficient. In particular, slide bearings can often not be satisfactorily supplied with lubricant by immersion lubrication.

SUMMARY OF THE INVENTION

The purpose of the present invention is to ensure the supply of lubricant to a transmission during emergency operation, while avoiding the disadvantages inherent in the systems known from the prior art. In particular, during emergency operation circulation lubrication with pressurized oil should be maintained, so that the system can be run down in a controlled manner without a lubricant shortage arising.

This objective is achieved by a system as described below and recited in the claims.

A system according to the invention for emergency lubrication comprises a lubricant pump and at least one outlet opening for conveying lubricant to at least one first transmission component to be lubricated. The transmission can in particular be that of a wind turbine and the component to be lubricated can be a slide bearing.

The outlet opening is arranged such that the lubricant emerging from the outlet opening reaches a lubrication point of the component to be lubricated. For example, a slide bearing can be provided with a bore through which the lubricant passes into a bearing gap. The point where the bore opens into the bearing gap is then the above-mentioned outlet opening. The outlet opening can also be a suitable nozzle fixed in the transmission.

According to the invention, the system comprises a first cavity. The lubricant pump is designed to convey at least some of the lubricant into the first cavity. In particular, for this purpose there is a lubricant-carrying connection between the lubricant pump and the first cavity.

The first cavity is designed for the intermediate storage of the lubricant and for acting upon the intermediately stored lubricant, i.e. the lubricant conveyed by the lubricant pump and introduced into the first cavity, with positional energy.

Positional energy means the same thing as potential energy. In a general sense, this is understood to mean the energy difference of a reference object between two different places within a conservative force field. Thus, potential energy is the energy of the reference object determined by its current position within the force field. The force field can be the Earth's gravitational field.

A spring, too, produces a conservative force field. Thus, the stress energy of the spring is potential energy.

Moreover, a line in which a liquid is acted upon by a pressure defines a conservative force field.

The reference object can in particular be the lubricant intermediately stored in the first cavity.

According to the invention, there is also a lubricant-conveying connection between the first cavity and the outlet opening. Thus, as a result of the action of positional energy upon the lubricant an energy difference is produced between the lubricant stored intermediately in the first cavity and the lubricant at the outlet opening. The lubricant stored intermediately in the first cavity is acted upon by positional energy relative to the lubricant at the outlet opening. Between the lubricant stored intermediately in the first cavity and the lubricant at the outlet opening there is a potential difference.

The positional energy with which the lubricant stored intermediately in the first cavity is acted upon, acts in such manner that the lubricant at the outlet opening is pressurized. Thus, the first cavity is formed such that at the outlet opening a pressure acts on the lubricant. This pressure serves to convey the lubricant to the first lubrication point. The pressure enables the lubrication not only of a hydrodynamic slide bearing, but also and in particular the lubrication of a hydrostatic slide bearing.

Since the lubricant pump is designed to deliver at least some of the lubricant into the first cavity, the lubricant pump is also suitable for producing the positional energy that acts upon the lubricant stored intermediately in the first cavity. Thus, during normal operation the lubricant pump serves among other things to build up the positional energy of the lubricant stored intermediately in the first cavity.

During emergency operation, i.e, if the lubricant pump has failed or loses pumping power, the positional energy of the lubricant stored intermediately in the first cavity ensures that the lubricant flows through the lubricant-conveying connection between the first cavity and the outlet opening, emerges at the outlet opening, and reaches the first lubrication point. During this the positional energy of the lubricant stored intermediately in the first cavity decreases.

During emergency operation, to prevent the lubricant from flowing back through the lubricant-conveying connection between the lubricant pump and the first cavity, the connection is preferably provided with a one-way valve.

In relation to the outlet opening the first cavity can be arranged at a high level. In that case the positional energy of the lubricant stored intermediately in the first cavity is at least in part energy attributable to the height difference between the first cavity and the outlet opening, as well as to the force of gravity acting on the lubricant.

Preferably however, the positional energy of the lubricant stored intermediately in the first cavity is pressure energy. Correspondingly, a preferred embodiment of the invention comprises at least one means for pressurizing the lubricant stored intermediately in the first cavity. This pressure spreads through the lubricant-conveying connection between the first cavity and the outlet, and causes the lubricant to emerge from the outlet opening and arrive at the first lubrication point.

An advantage of his embodiment compared with the positioning of the first cavity at a high level is that the structure is more compact. In particular, the first cavity can be arranged almost anywhere within the transmission.

In a further preferred embodiment of the invention the system comprises a container, which forms the first cavity. Within the container there is a movable piston. In addition, means are provided for acting upon the piston with a force. The force is directed in such manner that it moves the piston. The piston also forms a boundary surface of the first cavity. The movement of the piston therefore results in a change of the volume of the first cavity. This makes it possible, by means of the piston, to pressurize the lubricant stored intermediately in the first cavity. In particular, the force acting on the piston produces the pressure in the lubricant stored intermediately in the first cavity. The means for acting upon the piston with a force preferably consist of a spring, such as a spiral or helical spring, or a pneumatic spring, in particular a gas pressure spring.

A particularly preferred embodiment of the invention enables a combination of immersion and circulation lubrication. The circulation lubrication is enabled by the above-described lubricant pump with the outlet opening, the first cavity and the lubricant-conveying connection between the first cavity and the outlet opening. The immersion lubrication of at least a second lubrication point of the transmission is enabled by a lubricant reservoir. This is a sump filled with the lubricant. In particular, the sump can be the transmission housing.

The second lubrication point is at least partially immersed in the lubricant reservoir, so that at least part of the second lubrication point comes into contact with the lubricant in the lubricant reservoir. To ensure the emergency lubrication of the first lubrication point, the first cavity must be filled with lubricant. The result of that, however, would be to lower the lubricant level in the lubricant reservoir. In emergency operation the lubricant present in the first cavity would flow back into the lubricant reservoir. Consequently the lubricant level in the lubricant reservoir would rise. However, to ensure a constant supply of lubricant to the second lubrication point a constant level of lubricant in the lubricant reservoir is needed.

A volume-neutral emergency lubrication system in which the lubricant level in the lubricant reservoir remains constant can be achieved by virtue of a second cavity, from which a lubricant-carrying connection leads to the lubricant reservoir. This lubricant-carrying connection to the lubricant reservoir preferably opens into the reservoir below the lubricant level in the lubricant reservoir. In that way the lubricant can flow both from the lubricant reservoir into the second cavity and back again from the second cavity into the lubricant reservoir. The lubricant-conveying connection between the second cavity and the lubricant reservoir is preferably a suction and pressure line, i.e, a line designed to convey liquids under high and low pressures.

The lubricant pump, the lubricant-carrying connection between the lubricant pump and the first cavity, the first cavity, the lubricant-conveying connection between the first cavity and the outlet opening, the outlet opening, the first lubrication point and the lubricant reservoir are all part of the circulation lubrication system and therefore form a lubricant circuit which provides the circulation lubrication. Correspondingly, the lubricant pump is designed to convey at least some of the lubricant from the lubricant reservoir into the first cavity. Furthermore, the lubricant can flow back from the first lubrication point into the lubricant reservoir.

To make the circulation lubrication volume-neutral during emergency operation, at least one means for coupling the first cavity to the second cavity is provided. This coupling takes place in such manner that an outflow of a quantity of lubricant from the first cavity is accompanied by an inflow of the same quantity of lubricant from the lubricant reservoir into the second cavity. The quantity of lubricant that passes from the first cavity to the lubricant reservoir during emergency operation is thus transferred into the second cavity from the lubricant reservoir. In this way the lubricant level in the lubricant reservoir remains constant.

In a preferred further development of the volume-neutral emergency lubrication, the volumes of the first and second cavities are correlated in such manner that the total volume, or the sum of the volumes of the first and second cavities, remains constant. Correspondingly, the means for coupling the first and second cavities are such that if the volume of the first cavity decreases, the volume of the second cavity increases. Since the volumes of the two cavities determine the quantity of lubricant respectively contained in them, an outflow of a quantity of lubricant from the first cavity is accompanied by an inflow of the same quantity of lubricant into the second cavity from the lubricant reservoir.

The above-described coupling of the first cavity and the second cavity can be effected by means of a movable piston in the container. Thus, in a further preferred embodiment the container forms not only the first cavity but also the second cavity. The piston is between the first and second cavities and therefore separates the first cavity from the second cavity. A first face of the piston forms a bounding surface of the first cavity and a second face of the piston forms a bounding surface of the second cavity. When the piston moves, one of the two cavities becomes smaller whereas the respective other cavity increases in size by the same amount.

Preferably, the container is in the form of a hollow cylinder inside which the piston is arranged and can move. During this the piston is in contact with the inner envelope surface of the hollow cylinder along a closed contact surface in the circumferential direction. Preferably, the contact surface has the shape of the lateral surface of a cylinder. The piston separates the first cavity from the second cavity in a leak-proof manner.

As the lubricant-carrying connection between the first cavity and the outlet opening, as the lubricant-carrying connection between the lubricant pump and the first cavity and as the lubricant-carrying connection between the second cavity and the lubricant reservoir, tubes or hoses and in particular suction and pressure lines are appropriate. This allows the container to be accommodated at any desired position in the transmission, in particular wherever free fitting space is available.

Often, the lubricant reservoir is suitable for accommodating the container. Accordingly, in a preferred embodiment the container is accommodated at least partially inside the lubricant reservoir. In this way the lubricant-carrying connection between the second cavity and the lubricant reservoir can be designed particularly simply. The second cavity can be connected to the lubricant reservoir in a lubricant-conveying manner by means of a bore in the container. Preferably, the bore is below the lubricant level in the lubricant reservoir.

Basically, the first cavity can be connected in parallel or in series. For parallel connection a bypass is provided, which diverts lubricant past the first cavity. The bypass is a lubricant-conveying connection between the lubricant pump and the outlet opening. During normal operation the lubrication point is supplied with lubricant by way of the bypass. To prevent the first cavity from emptying during this, the lubricant-conveying connection between the first cavity and the outlet opening can be provided with a valve which is open when not energized with current. During normal operation, i.e. when there is a current, the valve is closed. If there is a loss of power, the valve opens so that the lubricant stored intermediately in the first cavity can get to the first lubrication point.

However, such an emergency lubrication system does not function independently of the cause of the lubricant pump's failure. Emergency lubrication only takes place when the lubricant pump is inactive because of a power failure. In contrast, if the lubricant pump is defective the valve that opens when not energized remains closed. Consequently, the lubricant supply to the first lubrication point breaks down.

In a preferred embodiment of the invention, therefore, the first cavity is connected in series. This means that all the lubricant delivered by the lubricant pump passes into the first cavity. From there, the lubricant passes through the lubricant-carrying connection between the first cavity and the outlet opening and on to the first lubrication point. This applies particularly during normal operation. Thus, the lubricant flows from the lubricant pump through the lubricant-carrying connection between the lubricant pump and the first cavity into the first cavity, and from there through the lubricant-carrying connection between the first cavity and the outlet opening to the outlet opening, where the lubricant reaches the first lubrication point. No lubricant bypasses the first cavity on its way to the outlet opening.

BRIEF DESCRIPTION OF THE DRAWINGS

Below, example embodiments of the invention illustrated in the figures are described in more detail. The same indexes are used to denote the same or functionally equivalent features. In detail, the figures show.

DETAILED DESCRIPTION OF THE PREFERRED EMBODIMENTS

Figure 1:
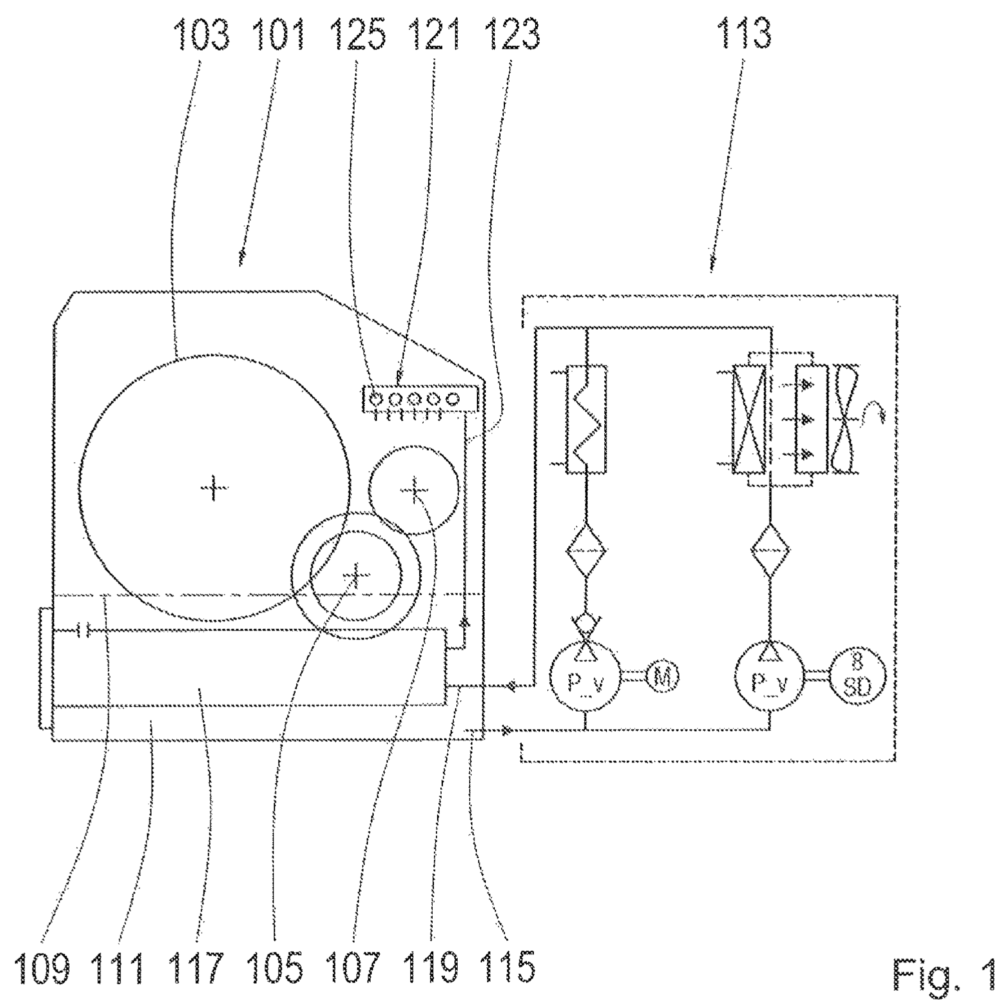
FIG. 1: A transmission with an integrated container for emergency lubrication.

The transmission 101 shown in FIG. 1 comprises three shafts 103, 105 and 107 with gearwheels. A first shaft 103 and a second shaft 105 are arranged in such manner that gearwheels on the two shafts 103 and 105 are partially below the level 109 of a lubricant reservoir 111 in the transmission 101. Thus, these gearwheels are lubricated by immersion.

In contrast, a gearwheel fitted on a third shaft 107 is above the lubricant level 109. Consequently it has to be lubricated by circulation. For that purpose a lubricant pump 113 is provided. Through a suction tube 115 the lubricant pump 113 delivers lubricant from the lubricant reservoir 111. From the pump 113, the lubricant passes into a container 117 by way of a line 119 running between the pump 113 and the container 117. From the container 117 the lubricant passes by way of a line running between the container 117 and a lubricant applicator 121 to the applicator 121. The lubricant applicator 121 has a plurality of outlet openings 125 through which the emerging lubricant reaches the gearwheel on the third shaft 107.

Figure 2:
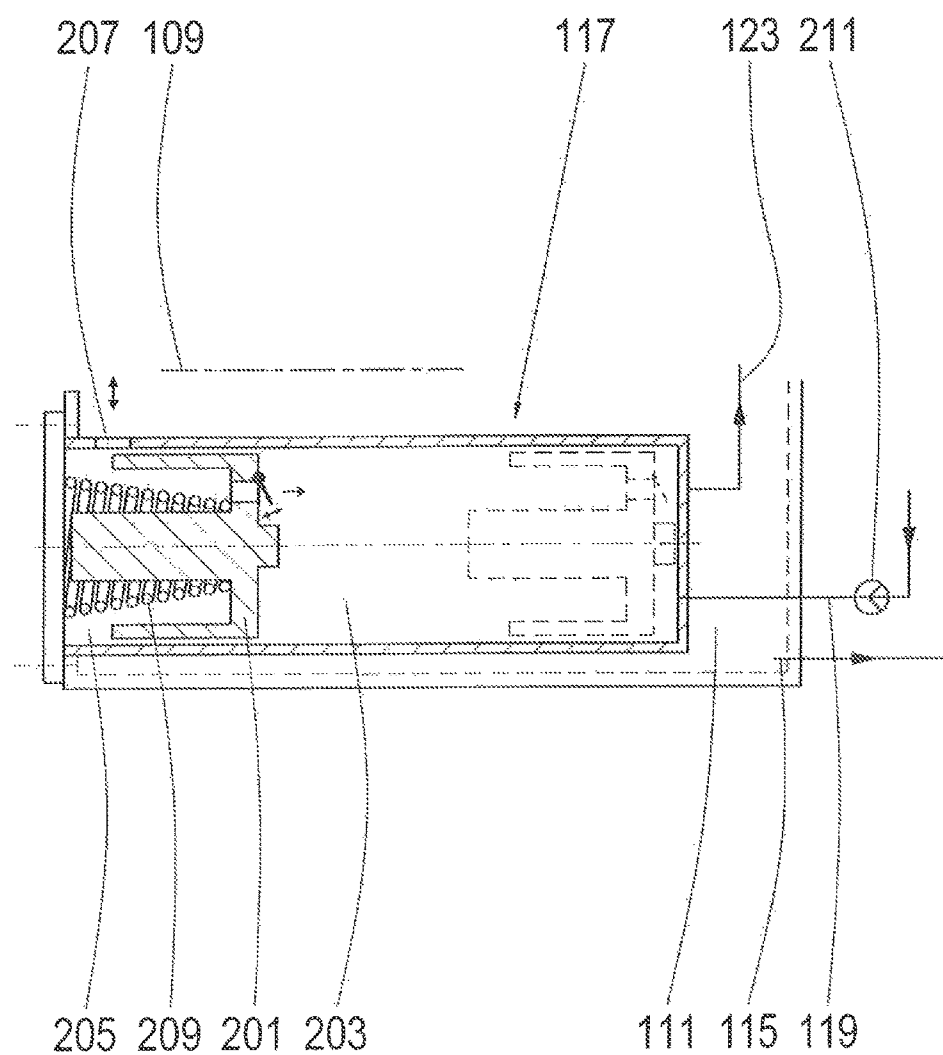
FIG. 2: The container for emergency lubrication, shown in detail.

FIG. 2 makes clear the structure of the container 117. The container is in the form of a hollow cylinder and therefore encloses a cylindrical space. A piston 201 divides the space into a first cavity 203 and a second cavity 205. The first cavity 203 is connected by the lubricant-conveying line 119 to the pump 113, from which it receives lubricant. In addition, the first cavity 203 is also connected by way of the lubricant-conveying connection 123 to deliver lubricant to the lubricant applicator 121 or to the outlet openings 125.

The piston 201 can be moved horizontally, i.e. axially relative to the container 117. In the view shown in FIG. 2, the piston 201 can be moved from left to right and from right to left.

When the lubricant pump 113 delivers lubricant into the first cavity 203, the piston 201—as viewed in FIG. 2—moves to the left. This increases the size of the first cavity 203 and reduces the size of the second cavity 205 to the same extent.

A bore 207 in the container 117 forms a lubricant-conveying connection between the second cavity and the lubricant reservoir 111. In particular, the bore 207 is below the level 109. During a movement of the piston 201 to the left, i.e. when the second cavity 205 becomes smaller, lubricant flows out of the second cavity 205, through the bore 207, and into the lubricant reservoir 111.

A spiral spring 209 exerts a force on the piston 201, which causes the piston 201 to move to the right, as seen in FIG. 2. If the pump 113 fails, this movement reduces the first cavity 203. So that the lubricant emerging from the first cavity does not flow back through the lubricant-carrying connection 119 to the pump 113 but rather, passes on to the lubricant applicator 121 by way of the lubricant-conveying connection 123, the lubricant-conveying connection 119 between the container 117 and the pump 113 is provided with a one-way valve 211.

By the same amount as the first cavity 203 is reduced, the second cavity 205 becomes larger. During this lubricant flows through the bore 207 from the lubricant reservoir 111 into the second cavity 205. Accordingly, the level 109 remains constant.

INDEXES

101 Transmission
103 Gearwheel
105 Shaft
107 Shaft
109 Lubricant level
111 Lubricant reservoir
113 Lubricant pump
115 Suction tube

117 Container
119 Line
121 Lubricant applicator
123 Line
125 Outlet opening
201 Piston
203 Cavity
205 Cavity
207 Bore
209 Spiral spring
211 One-way valve

The invention claimed is:

1. A system for emergency lubrication comprising:

a lubricant pump;

at least one outlet opening for delivering lubricant to at least a first lubrication point of a transmission;

a first cavity and a second cavity;

the lubricant pump being designed to convey at least some of the lubricant into the first cavity;

the first cavity being designed to store the lubricant intermediately and to act upon the intermediately stored lubricant with positional energy;

a first lubricant-conveying connection between the first cavity and the outlet opening;

a second lubricant-conveying connection between the second cavity and a lubricant reservoir;

at least one coupling means for coupling the first cavity and the second cavity such that an outflow of a quantity of lubricant from the first cavity is accompanied by an inflow of an equal quantity of lubricant from the lubricant reservoir into the second cavity.

2. The system according to claim 1, further comprising:

at least one acting means for acting upon the intermediately stored lubricant with a pressure.

3. The system according to claim 1, further comprising:

a container so that the container forms the first cavity;

a piston that is movable within the container; and at least one acting means for acting upon the piston with a force in such manner that the piston pressurizes the lubricant stored intermediately in the first cavity.

4. A system for emergency lubrication comprising:

a lubricant pump;

at least one outlet opening for delivering lubricant to at least a first lubrication point of a transmission;

a first cavity;

the lubricant pump being designed to convey at least some of the lubricant into the first cavity;

the first cavity being designed to store the lubricant intermediately and to act upon the intermediately stored lubricant with positional energy;

a lubricant-conveying connection between the first cavity and the outlet opening;

at least a piston for acting upon the intermediately stored lubricant with a pressure;

a container for forming the first cavity;

the piston being movable within the container;

at least one means for acting upon the piston with a force such that the piston pressurizes the lubricant stored intermediately in the first cavity;

a second cavity;

a lubricant-conveying connection between the second cavity and a lubricant reservoir;

the lubricant reservoir serving as immersion lubrication for at least one second lubrication point of the transmission;

the lubricant pump conveying at least some of the lubricant from the lubricant reservoir into the first cavity;

the lubricant being able to flow back from the first lubrication point into the lubricant reservoir;

the piston coupling the first cavity and the second cavity (205), such that an outflow of a quantity of lubricant from the first cavity is accompanied by an inflow of an equal quantity of lubricant from the lubricant reservoir (111) into the second cavity;

the container forming the second cavity; and the piston separating the first cavity (203) from the second cavity (205).

5. The system according to claim 4, wherein the container is arranged at least partly inside the lubricant reservoir.

6. The system according to claim 5, wherein all the lubricant delivered by the lubricant pump passes into the first cavity.

7. A system for emergency lubrication of a transmission with lubricant, the system comprising:

a lubricant pump for conveying the lubricant into a first cavity;

a lubricant-conveying connection between the first cavity and at least one outlet opening, and the at least one outlet opening delivering at least some of the lubricant from the first cavity to at least a first lubrication point of the transmissio;

the first cavity being designed to store the lubricant intermediately and to act upon the intermediately stored lubricant with positional energy;

a second cavity;

a lubricant-conveying connection between the second cavity and a lubricant reservoir;

the lubricant reservoir serving as immersion lubrication for at least one second lubrication point of the transmission;

the lubricant pump is designed convey at least some of the lubricant from the lubricant reservoir into the first cavity;

the lubricant can flow back from the first lubrication point into the lubricant reservoir; and at least one coupling means for coupling the first cavity and the second cavity such that an outflow of a quantity of lubricant from the first cavity is accompanied by an inflow of an equal quantity of lubricant from the lubricant reservoir into the second cavity.

8. The system according to claim 7, wherein the coupling means couples the first cavity and the second cavity in such manner that a reduction of volume of the first cavity is accompanied by an increase of volume of the second cavity, whereas a total volume of the first cavity and the second cavity remains substantially constant.

* * * * *